United States Patent [19]
Trautvetter et al.

[11] 3,755,246
[45] Aug. 28, 1973

[54] PROCESS FOR MANUFACTURING POLYVINYL FLUORIDE WITH IMPROVED THERMOSTABILITY

[76] Inventors: Werner Trautvetter, Hohlsteinstrasse 50, Spich; Gregor Weisgerber, Kantering 51, Ittenbach, both of Germany

[22] Filed: May 24, 1971

[21] Appl. No.: 146,495

Related U.S. Application Data

[63] Continuation of Ser. No. 810,387, March 25, 1969, abandoned.

[30] Foreign Application Priority Data

Mar. 26, 1968  Germany.................. P 17 70 054.8
July 24, 1968  Germany.................. P 17 70 962.5

[52] U.S. Cl...... 260/45.7 R, 117/132, 260/45.75 R, 260/45.75 K, 260/45.8 R, 260/45.8 A, 260/45.8 N, 260/45.85, 260/45.9 R, 260/45.95, 260/92.1, 264/211
[51] Int. Cl............................ C08d 11/04, C08f 3/22
[58] Field of Search ............ 260/45.7, 92.1, 92.1 S, 260/45.8 R, 45.8 A

[56] References Cited
UNITED STATES PATENTS
2,419,010  4/1947  Coffman et al................ 260/92.1 S
2,810,702  10/1957  Bechtold et al. .............. 260/92.1 S

*Primary Examiner*—Harry Wong, Jr.
*Attorney*—Burgess, Dinklage & Sprung

[57] ABSTRACT

Improvements in polyvinyl fluoride obtained by adding iodine or an iodine compound to the vinyl fluoride monomer prior to or during polymerization thereof and for adding iodine or an iodine compound to polyvinyl fluoride. The polymerization is preferably in the aqueous phase above the critical temperature in the presence of azo-bis-isobutyramidine hydrochloride and N-alkyl substituted such compounds as catalyst. The iodine content of the polymer, calculated as iodine, is preferably 0.001 to 1 weight percent based upon vinyl fluoride content.

15 Claims, No Drawings

PROCESS FOR MANUFACTURING POLYVINYL FLUORIDE WITH IMPROVED THERMOSTABILITY

This application is a continuation of application Ser. No. 810,387, filed Mar. 25, 1969, entitled "Process for Manufacturing Polyvinyl Fluoride with Improved Thermostability now abandoned."

This invention relates to polyvinyl fluoride. It more particularly refers to polyvinyl fluoride having improved thermal degradation resistance.

On account of its good resistance to ultraviolet and to weather, and its insensitivity to dirt and to a large number of chemicals, polyvinyl fluoride (PVF) is presently being used for the manufacture of sheet materials and, in the form of an organosol, for the manufacture of bake-on metal finishes, especially for outdoor use. Polyvinyl fluoride has the disadvantage, however, that it often does not have sufficient thermal stability at high working temperatures. This disadvantage is manifested, for example by a yellow to brownish yellow discoloration which occurs in the pressing of sheets, in the extrusion of sheet materials in the presence of a latent solvent, or in the baking on of dispersions in a latent solvent that have been applied to metal parts.

This tendency toward discoloration at high temperatures is shown especially by those vinyl fluoride polymers which have been manufactured at a polymerization temperature above the critical temperature (54.7°C) and in the presence of an aqueous phase containing a water-soluble polymerization initiator.

Attempts have been made to improve the stability of polyvinyl fluoride under thermal stress. For example, glyceryl monolaurate (U.S. Pat. No. 2,476,606), alkali formates (U.S. Pat. No. 2,996,478) or unsaturated terpenes and thiols (Brit. Pat. No. 898,182) have been proposed as stabilizers. One disadvantage in the use of these compounds resides in the fact that they have to be mixed into the polymer after it is made, and thus require an additional step in the manufacturing process.

It is therefore an object of this invention to provide a novel polyvinyl fluoride composition which has increased thermal degradation resistance.

It is another object of this invention to provide a novel method of making polyvinyl fluoride polymers.

It is a further object of this invention to provide a novel thermal degradation stabilizer for polyvinyl fluoride polymers.

Other and additional objects of this invention will become apparent from a consideration of this entire specification including the claims hereof.

In accord with and fulfilling these objects, one aspect of this invention resides in the thermal stabilization of polyvinyl fluoride polymer with iodine either as such or in compound form.

According to the present invention, a process is provided for the manufacture of polyvinyl fluoride in an aqueous phase above the critical temperature with the use of azo-bis-isobutyramidine hydrochlorides as catalysts. This process is characterized in that the polymerization is performed with the addition of 0.001 to 1 weight percent of iodine or compounds containing iodine (calculated as iodine and expressed as a percentage of the weight of the vinyl fluoride), or that corresponding quantities of iodine or compounds containing iodine are incorporated into the polymer after the polymerization.

According to the invention, those compounds are to be considered as iodine-containing compounds which contain anionically bound iodine, as for example hydroiodic acid, potassium iodide, ammonium iodide, or azo-bis-isobutyramidine hydroiodide (AIBA HI). Quaternary ammonium iodides can also be used according to the invention, in the form of cationic emulsifiers if desired. Iodine is preferably added in a solution in an aliphatic alcohol having about 1 to 4 carbon atoms, such as methanol, ethanol, isopropanol, etc. However, compounds containing organically bound iodine can also be used according to the invention. The use of these organic compounds has the advantage that, depending on the concentration on uses of these compounds, a regulation of the K value can be achieved in addition to an improvement in the thermostability of the polymer; but in particular they can be combined with other regulators, without reducing the rate of polymerization. In this manner, polyvinyl fluoride of good thermostability can be prepared with a K value that is suitable for fabrication, as for example 50 – 70.

Suitable iodine compounds containing organically bound iodine are all organic compounds which contain iodine, as for example linear or branched alkyl iodides, olefins containing iodine, aromatic and heterocyclic iodine compounds, compounds which contain a plurality of iodine atoms in the molecule, and also compounds which additionally contain other functional groups, providing that, in the concentration in which they are used, they do not inhibit the polymerization. The compounds are added in the form of aqueous suspensions or dissolved in an aliphatic alcohol having 1 to 4 carbon atoms.

Iodine compounds according to this invention include ammonium iodides, potassium iodide, azo-bis-isobutyramidine hydroiodide, iodine, isopropyl iodide, tetraiodoethylene, iodobenzene, 2-iodothiophene, ethyl iodide, isodopyridine, iodocyclohexane, etc. The iodo compounds thus can be categorized as iodine salts of alkali and alkaline earth metals; iodides of at least one metal selected from the group consisting of aluminium, gallium, indium, tin, lead and the transition elements, except silver; hydroiodide quaternary salts of organic nitrogen compounds; alkyl iodides preferably having up to about six carbon atoms in branched or straight chain configuration; cycloaliphatic iodides preferably having about 4 to 8 carbon atoms in the ring and possibly having lower alkyl, e.g., up to about 6 carbon atoms, substitution on the ring; aromatic iodides preferably having one or two fused or unfused benzene rings which may contain up to about five alkyl, preferably lower alkyl, substituents and having up to about six iodo substituents thereon; and heterocyclic compounds having N, S or O hetero atoms in a 5 to 8 membered ring structure with 1 to 4 iodo substituents thereon which may additionally have alkyl, preferably lower alkyl, substitutents thereon.

In the case of polyvinyl fluoride polymerized in the presence of the iodine compounds, discoloration occurs not at all or only to a slight extent during the thermal stress the polymer undergoes during fabrication.

The addition of the iodine compounds is performed preferably at the beginning of the polymerization; it is, however, also possible to incorporate them into the finished polymer, in order to achieve the desired improvement in the thermostability of the polyvinyl fluoride. Azo-bis-isobutyramidine hydrochloride (AIBA HCl) or those of its N-alkyl substitution products which are known as catalysts are used as the polymerization catalysts. The improvements in the characteristics of the polymer are judged by optical and thermogravimetric methods.

The following Examples are illustrative of this invention without being limiting thereon:

EXAMPLE 1

A stainless steel autoclave (capacity 2 liters), equipped with a double jacket for heating and cooling and with an anchor stirrer, is filled with 1300 ccm of water which has been desalted in an ion exchanger. Then the autoclave is closed and flushed out three times with vinyl fluoride. 350 g of vinyl fluoride is forced in by nitrogen from a heated pressure vessel. Then the autoclave is heated to 75°C, and the stirrer is adjusted to a speed of 180 rpm. A pressure of 200 kp/cm² establishes itself. A metering pump is then used to pump 0.52 g of azo-bisisobutyramidine hydrochloride (AIBA HCl) in 50 ml of water into the autoclave; the pump is flushed out by pumping in an additional 50 ml of water. The pressure slowly diminishes, while the temperature is kept constant at 75°. After a reaction time of 150 minutes the pressure has dropped to 10 to 20 kp/cm². Then the autoclave is cooled and opened. The polyvinyl fluoride emulsion is coagulated with a high-speed agitator (5000 rpm) and centrifuged. The moist material (approx. 50 percent water content) is dried at 70°, ultimately in vacuo. Yield: 315 g (90 percent, K value 94, measured at 120° in a 1 percent solution in cyclohexanone.

EXAMPLE 2

The procedure is the same as in Example 1 with the following difference. After pumping in 0.52 g of AIBA HCl in 25 ml of water and flushing out with 25 ml of water, 35 mg of ammonium iodide in 25 ml of water are pumped in; the pump is flushed with another 25 ml of water. After 150 min., the pressure has dropped to 30 kp/cm². After processing as in Example 1, 300 g (86 percent) of PVF is obtained, K value 89.

EXAMPLE 3

The procedure is the same as in Example 2 with the following difference. Only 0.4 g of AIBA HCl in 25 ml of water is used as the catalyst; instead of NH₄I, 100 mg of azo-bis-isobutyramine hydroiodide (AIBA HI) in 25 ml of water is pumped in as above. The final pressure after a reaction time of 150 minutes amounts to 52 kp/cm². Yield: 260 g (74 percent), Kvalue 95.

EXAMPLE 4

The procedure is the same as in Example 2 with the following difference: instead of ammonium iodide, 40 mg of potassium iodide dissolved in 25 ml of water is pumped in. The final pressure after a reaction time of 150 minutes amounts to 40 kp/cm². Yield: 280 g (80 percent), K value 90.

EXAMPLE 5

The procedure is the same as in Example 2, with the following difference; instead of ammonium iodide, 30 mg of iodine dissolved in 10 ml of isopropanol is pumped in. Then the pump is flushed with 40 ml of mater and the reaction product is further processed as above. The final pressure after a reaction time of 150 minutes is 40 kp/cm², yield: 270 g (77 percent), K value: 90.

EXAMPLE 6

100 g of dried PVF from Example 1 is suspended with mechanical agitation in 300 ml of absolute methanol in which 10 mg of NH₄I is dissolved. Then the mixture is dried at 50°, the drying being completed in vacuo.

The discoloration of the polymer under thermal stress is judged on the basis of pressed plates and extruded specimens, and compared with the weight loss that is thermogravimetrically measured in relation to the temperature.

a. The discoloration of plates pressed at 200°C with a pressure of 20 kg/cm² is estimated by comparison with the iodine color scale of DIN 6162. The values obtained from Examples 1 to 6 are listed in Table 1. The percentages stated for the iodine compounds added, in Tables 1 – 3, are calculated on the basis of iodine and relate to the amount of vinyl fluoride that was used.

TABLE 1

| Specimen | Iodine Color No. |
|---|---|
| PVF, prepared without additive | approx. 130 |
| PVF, prepared with the addition of NH₄I (0.009%) | approx. 1 |
| PVF, prepared with addition of AIBA HI (0.016%) | approx. 2 |
| PVF, prepared with addition of KI (0.009%) | approx. 7–10 |
| PVF, prepared with addition of I₂ (0.009%) | approx. 7–10 |
| PVF, prepared without additive, and then mixed with NH₄I (0.009%) dissolved in methanol | approx. 70 | b. Extruded specimens are graded according to color. By extruding a mixture of PVF with a latent solvent (e.g., propylene carbonate) in a 2:1 ratio, using a laboratory extruder (die temperature 200°C), strands having a diameter of 5 mm are obtained, which are differently colored. Examples are listed in Table 2.

TABLE 2

Appraisal of Extruded Specimens

| Specimen | Judgment |
|---|---|
| PVF, prepared without additive | Definitely yellow |
| PVF, prepared with the addition of NH₄I (0.009%) | Almost colorless |
| PVF, prepared with the addition of AIBA HI (0.016%) | Almost colorless |
| PVF, prepared without additive, then NH₄I (0.009%) dissolved in methanol added | Slightly yellowish tint | c. The 0.2 percent, 1 percent, 5 percent and 10 percent weight loss in relation to the temperature is measured thermogravimetrically on powders. A number of the readings are shown in Table 3.

TABLE 3

Thermogravimetric analysis (Mettler "Thermoanalyser")

| Specimen | Weight Loss at °C | | | |
|---|---|---|---|---|
| | 0.2% | 1% | 5% | 10% |
| PVF, prepared without additives approx. | 300 | 335 | 385 | 400 |
| PVF, prepared with the addition of NH₄I (0.009%) approx. | 340 | 370 | 400 | 415 |

It is clearly apparent from Tables 1 to 3 that the polyvinyl fluoride prepared according to the invention has a markedly improved thermostability in comparison with one prepared without additives.

EXAMPLE 7

The procedure is the same as in Example 1, with the following difference: After the pumping in of 0.52 g of AIBA HCl in 25 ml of water and rinsing with 25 ml of water, 0.35 g of isopropyl iodide, suspended in 25 ml of water, is pumped in; the pump is flushed out with another 25 ml of water. After 4 hours the pressure has fallen to 40 kp/cm$^2$. After processing as in Example 1, 290 g (83 percent) of PVF is obtained, having a K value of 70.

EXAMPLE 8

The procedure is the same as in Example 7, with the following difference: Instead of isopropyl iodide, 35 mg of tetraiodoethylene dissolved in 5 ml of t-butanol is pumped in, and the pump is flushed with 45 of water. The final pressure after a reaction time of 150 min. is 30 kp/cm$^2$. Yield: 300 g (86 percent), K value: 85.

EXAMPLE 9

The procedure is the same as in Example 8, with the following difference: Instead of tetraiodoethylene, 35 mg of iodobenzene is pumped in. The final pressure after a reaction time of 150 min. is 50 kp/cm$^2$. Yield: 260 g (74 percent), K value: 90.

EXAMPLE 10

The procedure is the same as in Example 8, with the following difference: Instaed of tetraiodoethylene, 35 mg of 2-iodothiophen is pumped in. The final pressure after 150 minutes is 75 kp/cm$^2$. Yield: 210 g (60 percent), K value:90.

EXAMPLE 11

The procedure is the same as in Example 8, with the following difference: Instead of Tetraiodoethylene, 70 mg of ethyl iodide, suspended in 25 ml of water, is pumped in; the pump is flushed out with another 25 ml of water. After 3 hours the pressure drops to 30 kp/cm$^2$. Yield: 290 g (83 percent), K value 78.

EXAMPLE 12

100 g of dried PVC from Example 1 is suspended with mechanical agitation in a solution of 1 g of ethyl iodide in 300 ml of absolute methanol. Then the mixture is dried at 50°C, lastly in vacuo.

The discoloration of specimens 1 mm thick (roller hides) produced by 5 minutes of rolling at 200°C is estimated by comparison with the iodine color scale of DIN 6162.

The values obtained from Example 1 and 7–12 are listed in Table 4:

TABLE 4

| Ex. No. | Iodine Compounds | % with ref. to vinyl fluoride | Iodine % with ref. to VF | Iodine Color Number |
|---|---|---|---|---|
| 1 | reference polyvinyl fluoride without addition | | | 100–130 |
| 7 | isopropyl iodide | 0.1 | 0.075 | 5 – 7 |
| 8 | tetraiodoethylene | 0.01 | 0.0095 | 7 – 10 |
| 9 | iodobenzene | 0.01 | 0.0062 | 10 – 12 |
| 10 | 2-iodothiophene | 0.01 | 0.006 | 15 – 20 |
| 11 | Ethyl iodide | 0.02 | 0.016 | 5 – 7 |
| 12 | Ethyl iodide | 1 | 0.81 | 5 – 7 |

What is claimed is:

1. In the process for producing thermally stable polyvinyl fluoride which polyvinyl fluoride is produced by polymerizing vinyl fluoride at a temperature higher than 54.7°C in an aqueous phase in the presence of an azo-bis-isobutyramidine hydrochloride catalyst; the improvements whereby increasing the thermostability of said polyvinyl fluoride, which comrpises admixing the polymerization reaction means with about 0.001 to 1 weight percent, calculated as iodine, based upon vinyl fluoride monomer, of at least one iodine containing compound.

2. Improvement claimed in claim 1, including admixing said iodine compound with said vinyl fluoride prior to and during said polymerizing.

3. The improved process claimed in claim 1, including mixing said iodine compound with said polyvinyl fluoride after such polymer has been produced.

4. The improved process claimed in claim 1, wherein said iodine containing compound is iodine.

5. The improved process claimed in claim 1, wherein said iodine containing compound is an inorganic iodine salt.

6. The improved process claimed in claim 1, wherein said iodine containing compound is an organic hydroiodide salt.

7. The improved process claimed in claim 1, wherein said iodine containing compound is an organic iodide.

8. The improved process claimed in claim 1, wherein said iodine containing compound is an alkyl iodide having up to about 6 carbon atoms in said alkyl group.

9. The improved process claimed in claim 1, wherein said iodine containing compound is a cyclo alkyl, aryl or heterocyclic iodide.

10. The improved process claimed in claim 9, wherein said hetercyclic compound contains at least one hetero atom selected from the group consisting of oxygen, nitrogen and sulfur.

11. The improved process claimed in claim 8, carried out in the presence of about 0.01 to 1 weight percent iodine.

12. The improved process claimed in claim 1, carried out in the additional presence of a chain regulator.

13. The improved process claimed in claim 1, wherein said iodine compound is dissolved in an aliphatic alcohol having 1 to 4 carbon atoms and the solution admixed with vinyl fluoride monomer in an aqueous medium prior to or during polymerization.

14. Polyvinyl fluoride polymer composition containing about 0.001 to 1 weight percent, calculated as iodine, based upon the vinyl fluoride moiety content of said polymer of at least one iodine compound, saod polyvinyl fluoride produced by polymerizing vinyl fluoride at a temperature higher than 54.7°C in an aqueous phase in the presence of an azo-bisisobutyramidine hydrochloride catalyst.

15. The composition claimed in claim 14, wherein said iodine compound is at least one member selected from the group consisting of ammonium iodide, potassium iodide, azo-bis-iso-butyramidine hydroiodide, iodine, isopropyl iodide, tetraiodoethylene, idobenzene, iodothiophene, iodocyclohexane, and ethyl iodide.

* * * * *

UNITED STATES PATENT OFFICE
CERTIFICATE OF CORRECTION

Patent No. 3,755,246           Dated August 28, 1973

Inventor(s) Werner Trautvetter et al.

It is certified that error appears in the above-identified patent and that said Letters Patent are hereby corrected as shown below:

Column 1, line 7, after "thermostability" insert a quote (").
Column 2, line 38, "isodopyridine" should read -- iodopyridine --.
Column 3, lines 30 and 31, after "90 percent" insert a closing parenthesis; line 67, "mater" should read -- water --. Column 5, line 17, after "45" insert -- ml --. Column 6, line 10, after "reaction" change "means" to -- mass --; line 53, "saod" should read -- said --; line 63, at the end of the line, "idobenzene" should read -- iodobenzene --.

Signed and sealed this 9th day of July 1974.

(SEAL)
Attest:

McCOY M. GIBSON, JR.           C. MARSHALL DANN
Attesting Officer              Commissioner of Patents